Feb. 19, 1924.
L. C. WELCH
1,483,959
VARIABLE SPEED COMPENSATING DEVICE FOR THE CONTROL OF
DIFFERENTIAL AND BRAKE MECHANISMS
Filed Sept. 17, 1923
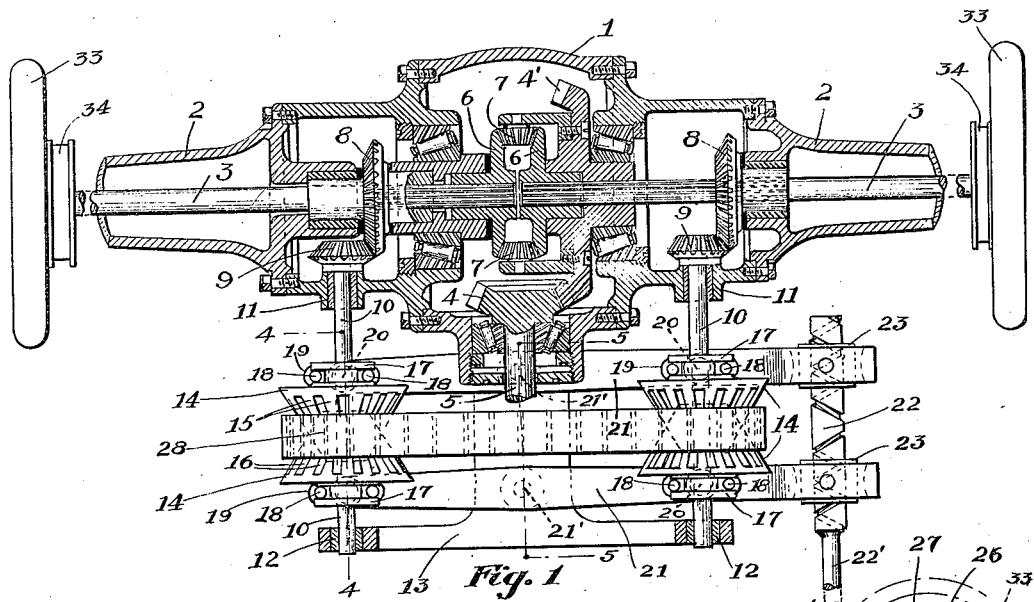
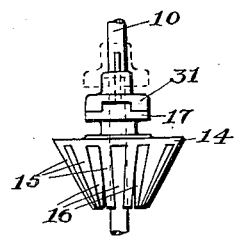
Fig. 2
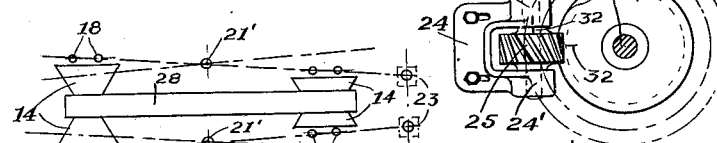
Fig. 3
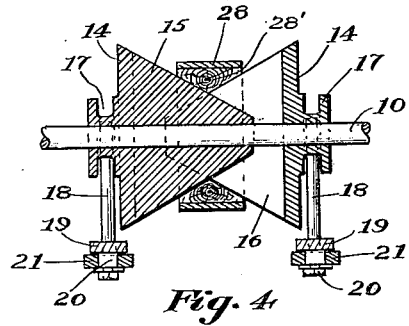
Fig. 4
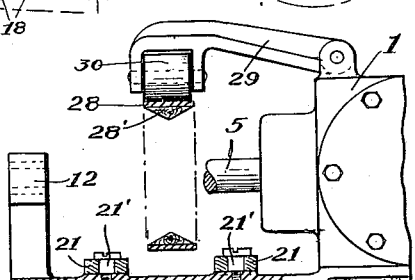
Fig. 5
Inventor.
Lewis C. Welch.

Patented Feb. 19, 1924.

1,483,959

UNITED STATES PATENT OFFICE.

LEWIS C. WELCH, OF PORTLAND, MAINE.

VARIABLE-SPEED COMPENSATING DEVICE FOR THE CONTROL OF DIFFERENTIAL AND BRAKE MECHANISMS.

Application filed September 17, 1923. Serial No. 663,184.

*To all whom it may concern:*

Be it known that I, LEWIS C. WELCH, a citizen of the United States, residing at Portland, in the county of Cumberland and State of Maine, have invented new and useful Improvements in a Variable-Speed Compensating Device for the Control of Differential and Brake Mechanisms, of which the following is a specification.

My invention deals with the propelling parts of motor cars and trucks and relates principally to the differential, so called, the function of which is to equally distribute the power from the motor to the two traction wheels, regardless of whether the wheels are revolving at the same number of revolutions, —as when the vehicle is on a straight-away course, or at different speeds,—as when the car or truck is making a turn.

By the interposition of a planetary gear set between the two axles of the traction wheels, and transmitting power through a master gear which carries a spider upon which are mounted the pinions of the planetary gear system, the wheels may revolve at different speeds and yet they will each carry its proportionate share of work in propelling the vehicle,—the only condition being that each has the proper and the same condition of traction surface upon which to act.

It sometimes happens, however, that one of the wheels contacts with a slippery surface, while the other one has firm footing. Under these conditions the former will spin and rotate at double the proper speed, while the latter wheel will not revolve at all.

One of the purposes of my invention is to overcome this objectionable feature of the ordinary differential gearing which allows one wheel to rotate at other than the proper speed, relative to that of the other wheel, and I accomplish my object not by eliminating the differential but by supplementing it with a variable speed compensating device, consisting of a mechanism in direct connection with the axles, allowing and compelling each of the latter to rotate at the proper speed ratio, when the vehicle is travelling either in a straight course or making a turn, or whether one, or both, of the wheels has good or bad road traction. Another, and perhaps more important, feature of my invention is its ability to control the braking of the vehicle. As both traction wheels are in connection, one with the other, through the agency of the compensating device, power applied to brake one wheel will necessarily be communicated to the other wheel, so that, if by chance but one brake is in operative condition this one brake will operate to control both traction wheels. Many cases of skidding of vehicles are caused by faulty brake adjustments, causing the braking power to be applied to but one wheel. My compensator makes both wheels synchronize. The compensating device is operated directly from connections to the steering wheel of the vehicle, so that it is automatic in its action. To relieve somewhat the labor of steering, with this added duty, I drive the compensator at a somewhat greater speed than the axles, which, with the balanced effect of the pulley actuating levers, makes the belt shifting operation easier.

In the drawings accompanying this specification, Fig. 1 is a horizontal plan, partly in section, of the compensating device with its proper connection to the differential of a motor vehicle; Fig. 2 is a plan of one of the variable speed cone pulleys and illustrates one method of disengaging it from the driving shaft; Fig. 3 is a diagram showing the compensator parts in one extreme position; Fig. 4 is a sectional view of the cone pulleys, showing their interlocking features,—section being taken on line 4—4, Fig. 1, and Fig. 5 is a transverse section through the drive belt, taken on lines 5—5, Fig. 1 and showing the belt tightener.

Similar numerals refer to similar parts throughout the several views of the drawing.

Referring to Fig. 1, 1 represents the differential housing, 2, 2 the axle tubes, 3, 3 the axles, 4 the main drive pinion, 4' the main drive or master gear and 5 the shaft which extends forward to the transmission gear box (not shown). The planetary gears 6, 6, and pinions 7, 7 complete the list of parts in the ordinary differential assembly.

Directly connected to the axles 3, 3, are bevel gears 8, 8, engaging pinions 9, 9—the latter attached individually to each of the shafts 10, 10. One end of these shafts (10) rotate in bearings 11, 11, on extensions from the differential housing, and the other ends of the said shafts operate in bearings 12, 12,—the latter being integral with the bifurcated bracket member 13 which is also attached to the differential housing.

Interposed between the bearings 11 and 12 is a variable speed mechanism, consisting of cone pulleys 14, 14 interlocking by means of tongues and grooves 15 and 16 respectively. These pulleys, assembled in pairs, are slidably mounted on the shafts 10, 10, one set on each shaft, with their larger diameters outwardly disposed and having grooved collars 17, 17 integral therewith and adapted to engage studs 18, 18, extending upwardly from the swiveling plates 19, 19, the latter pivotally mounted, by means of the studs, 20, 20 on the oscillating arms, 21, 21. These arms (21) are pivoted by means of studs 21', 21' to the bracket 13. At 22 is a screw, engaging the nuts 23, 23, one nut being tapped with a right hand and the other with a left hand screw thread. A shaft 22' extending from and integral with the screw 22, with proper aligning means, such as universal joints (not shown), terminates in a bifurcated bracketed member 24 having bearings 24', 24'. Secured to the shaft 22', and between the bearings 24', 24', is a spiral pinion 25 in engagement with a spiral gear 26, the latter being mounted rigidly on the steering post 27.

Operating over the two sets of cone pulleys is an endless belt 28 with lags 28' to fit the conical recess between the faces of the pulleys. Pivoted on the housing 1 is a belt tightener arm 29 having a pulley or wheel 30 adapted to contact with the belt 28 to provide proper tightness of same on the pulleys.

If occasion should require that the compensator be detached or made inoperative I may provide a dental clutch 31, or other means to serve the same purpose, and this device will be placed on the shafts 10, 10, between the collars 17 and the bearings 11.

I have also provided means for disconnecting the spiral pinion 25 from the spiral gear 26 by slotting the holes for the clamping bolts in the bracket 24 which will allow the latter to be moved and the pinion 25 to be disengaged from the gear 26. Marks 32 are made in both the gear and pinion to provide accurate register when the device is again reinstated.

Given proper road traction to both driving wheels, with no slipping on the surface traversed, and traveling in a straight course, the two traction wheels of a motor vehicle should revolve at the same rate of speed. In making a turn or deviating from the straight course the wheels should revolve at different speeds relatively, depending on the radii of the arcs of the circles in which each moves.

In Fig. 1 the compensating device is shown attached to the differential assembly with the position of its working parts such as would indicate that the vehicle must travel, or at least that the steering wheel was set for it to travel, in a straightaway course. Should the steering wheel, which is indicated by the dot-and-dash lines 33, be turned in either direction, to the right or left, the result would be to separate or bring together as the case might be the nuts 23, 23, which would have the effect of protracting one set and retracting the other set of cone pulleys, varying their effective working diameters in the same ratio as the speed of the axles and traction wheels increased or decreased. Under this latter condition the relative position of the cone pulleys will best be understood by observing Fig. 3 in which one extreme position of both sets is shown, one set being at its largest and the other set at its smallest diameter. As the working diameters of the two sets of pulleys vary in just the proper ratio to rotate the pinions 9, 9 in synchronism with the gears 8, 8 and axles 3, 3 the wheels are held to their proper traction speeds without one wheel being able to increase speed or spin on the other unduly.

Again referring to Figs. 1, 33, 33 represent the traction wheels having brake drums 34, 34 integral therewith. As these wheels are fixed on the axles 3, 3 and as the rotatable movements of the latter are controlled and restricted by and in continuous connection with the compensating device, it will be apparent that, if by accident or neglect, the brake mechanism on one wheel should become defective and inoperative, the power applied to the brake in working condition will be communicated, through the compensating device, to the opposite wheel, on which is the disabled brake, and operate to resist the turning movement of that member. I have therefore, in my compensator, added a safety feature of no inconsiderable value.

It will be observed that the function of my compensating device is not as an active propelling agent as under ordinary good road conditions, with efficient brakes, it has no particular duty to perform. The power to drive the vehicle is transmitted through the pinion and gears of the ordinary differential gear set, and only when one wheel is out of order and spins or rotates at greater than its proper speed, or the speed to which good traction will hold it, is the compensator required to act and restrain the overspeeding wheel or provide a substitute for a disabled or inefficient brake.

Having thus described my invention what I claim and desire to protect by Letters Patent is:

1. In a variable speed compensating device for the control of differential gear mechanisms, the combination, with a differential, consisting of a planetary set of gears interposed between the driving axles of a motor vehicle and driven by a master gear and pinion, of a gear fixed on each of the axles of said differential, pinions engaging said gears, shafts fixed in said pinions, bearings supporting said shafts, two cone pulleys slidably mounted on each of said shafts, their smaller diameters adjacent, with their faces adapted to interlock by means of tongues and grooves cut on same and forming when interlocked a V shaped periphery, a belt encompassing both sets of said cone pulleys and adapted to move in said V formation and constituting a drive from one set of pulleys to the other set, means for protracting one set of said interlocking cone pulleys coincidently with the retracting of the other set of said interlocking cone pulleys, whereby the effective working diameters of said cone pulleys may be either decreased or increased respectively and means for actuating said cone pulleys by direct connection with the steering wheel post of a motor vehicle.

2. In a variable speed compensating device for the control of differential and brake mechanisms, the combination, with a planetary gear differential rear axle drive, with traction wheels driven by said axles, and brake drums attached to said wheels, of a supplementary gear fixed on each of said axles, a pinion engaging each of said gears, shafts revoluble in bearings, with one end of each of said shafts secured to each of said pinions, two conical interlocking pulleys, their intersecting faces forming a V shaped periphery, slidably mounted on each of said shafts, means for increasing and decreasing the working diameter of each set of said cone pulleys by retracting and protracting respectively the two pulleys in each of said sets, means for increasing the working diameter of one set of said cone pulleys coincidentally with decreasing the working diameter of the other said sets, an endless belt circumventing both sets of said cone pulleys and serving as a connecting means between them, whereby a continuous and constant connection may be established between the two said brake drums on said wheels, and means for actuating said sets of cone pulleys by a connection to, and through the agency of, the steering wheel post of a motor vehicle.

3. The combination, with the driving axles of a motor vehicle and a differential gear drive mechanism engaged therewith, of means interconnecting the two axles embodying a speed-ratio-changing device, and connections for operating said device from the steering wheel of the vehicle, whereby said device is responsive to, and in synchronism with, any turning movement of the vehicle as controlled by said steering wheel.

4. The combination, with the driving axles of a motor vehicle, with a differential gear drive mechanism engaged therewith, and vehicle steering mechanism, of separate means interconnecting said driving axles and embodying a speed changing device, and connections responsive to said steering mechanisms for actuating said device, whereby the relative rotatable speed of the two said axles may be held at all times to the same ratio of rotatable speed, either increasing or decreasing, as that of the said speed changing device, during any and all positions of the steering wheel of said steering mechanism.

LEWIS C. WELCH.